United States Patent
Seyedi-Esfahani et al.

(10) Patent No.: US 8,116,231 B2
(45) Date of Patent: Feb. 14, 2012

(54) APPARATUS AND METHOD FOR ENABLING DISCOVERY OF WIRELESS DEVICES

(75) Inventors: Seyed-Alireza Seyedi-Esfahani, Fairport, NY (US); Chun-Ting Chou, Taipei (TW); Richard Chen, Croton-On-Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 267 days.

(21) Appl. No.: 12/522,966

(22) PCT Filed: Jan. 17, 2008

(86) PCT No.: PCT/IB2008/050177
§ 371 (c)(1),
(2), (4) Date: Nov. 17, 2009

(87) PCT Pub. No.: WO2008/087604
PCT Pub. Date: Jul. 24, 2008

(65) Prior Publication Data
US 2010/0061271 A1  Mar. 11, 2010

Related U.S. Application Data

(60) Provisional application No. 60/885,663, filed on Jan. 19, 2007.

(51) Int. Cl.
*H04L 12/28* (2006.01)
(52) U.S. Cl. ........ 370/254; 370/318; 370/331; 370/336; 370/345; 370/453; 455/63.1; 455/436; 455/453; 455/522
(58) Field of Classification Search .................. 370/254, 370/318, 331, 332, 336, 337, 345, 395.4; 455/63.1, 436, 453, 522
See application file for complete search history.

(56) References Cited

U.S. PATENT DOCUMENTS

| | | | | |
|---|---|---|---|---|
| 5,483,537 | A * | 1/1996 | Dupuy | 370/337 |
| 7,746,816 | B2 * | 6/2010 | Attar et al. | 370/318 |
| 7,885,239 | B1 * | 2/2011 | Oroskar et al. | 370/336 |
| 2001/0036843 | A1 | 11/2001 | Thompson | |
| 2003/0017831 | A1 * | 1/2003 | Lee et al. | 455/453 |
| 2005/0249170 | A1 | 11/2005 | Salokannel | |
| 2006/0089141 | A1 * | 4/2006 | Ho et al. | 455/436 |
| 2009/0232109 | A1 * | 9/2009 | Nandagopalan et al. | 370/336 |

FOREIGN PATENT DOCUMENTS
WO  WO2005076533 A1  8/2005
WO  WO2006043242 A1  4/2006

* cited by examiner

*Primary Examiner* — Ayaz Sheikh
*Assistant Examiner* — Andrew C Lee
(74) *Attorney, Agent, or Firm* — Larry Liberchuk

(57) ABSTRACT

A wireless device (A) in a first antenna sector (40) is discovered using a directional antenna (322), which sends and receives signals in multiple antenna sectors. Multiple primary beacons are transmitted in corresponding primary beacon time slots (1P-4P), which correspond to the antenna sectors (10-40) and have associated secondary beacon time slots (1s-4s). A secondary beacon is received from the wireless device in a first secondary beacon time slot (4sA) associated with a first primary beacon time slot (4P) corresponding to the first sector, the secondary beacon being responsive to a first primary beacon included in the first primary beacon time slot. An additional first secondary beacon time slot (4s) is added in association with the first primary beacon time slot. The additional first secondary beacon time slot enables an additional wireless device in the first sector to send an additional secondary beacon in response to a subsequent first primary beacon included in the first primary beacon time slot.

20 Claims, 7 Drawing Sheets

APPARATUS AND METHOD FOR ENABLING DISCOVERY OF WIRELESS DEVICES

CROSS-REFERENCES TO RELATED APPLICATION

This patent application claims the priority benefit under 35 U.S.C. §119(e) of U.S. Provisional Patent Application 60/885,663, filed on 19 Jan. 2007, the entirety of which is hereby incorporated by reference for all purposes as if fully set forth herein.

TECHNICAL FIELD

This invention pertains to the field of wireless communications, and more particularly, to a wireless communication device and method of wireless communications that enables wireless devices to discover one another using directional antenna systems.

BACKGROUND AND SUMMARY

Advancements continue to be made in wireless communications technology. For example, wireless local area networks (WLANs) and wireless personal area networks (WPANs) networks are becoming more common in homes and businesses. Such networks may include a variety of independent wireless electronic devices or terminals, which wirelessly communicate with one another. WLANs and WPANs may operate according to a number of different available standards, including IEEE standards 802.11 (Wi-Fi), 802.15 (Bluetooth) and 802.16 (WiMax), as well as the WiMedia Alliance Ultra-Wideband (UWB) standard.

FIG. 1 is a block diagram showing a conventional wireless network 100, including multiple terminals configured to communicate with one another over exemplary WPAN 125. The wireless terminals may include any electronic devices or nodes configured to communicate with one another. For example, FIG. 1 may depict a home network in which the electronic devices include a personal computer 120, a digital television set 121, a digital camera 122 and a personal digital assistant (PDA) 123. The network 100 may also include an interface to other networks, such as modem 130, to provide connectivity of all or some of the wireless devices 120-123 to the Internet 140, for example. Of course, there are many other types of wireless networks in which electronic devices communicate with one another, including networks in manufacturing plants, medical facilities, security systems, and the like.

Wireless devices may communicate with one another using directional antennas, which extend transmission range. For example, recent wireless networks operate in very high frequency bands (e.g., 60 GHz), and thus use directional antennas to compensate for high path loss associated with high frequency bands. In both centralized and distributed wireless networks, wireless devices using directional antennas must align their respective antennas at the same time in order to communicate. In other words, the wireless devices must first find each other, which is accomplished by the wireless devices scanning (e.g., sweeping their antenna beams) around surrounding areas. However, the wireless devices may not discover one another unless there is pre-coordination among them to assure that they are sweeping their antenna beams at the same time.

Beacons are widely used to convey important control information between devices. For example, an IEEE 802.11 access point periodically sends out beacons so that the IEEE 802.11 wireless devices around the access point can associate with the access point and communicate. As stated above, if the wireless devices, including the access point, use directional antennas for beacon transmission and reception, they must know the direction of each other's antennas. This requires a protocol to coordinate the wireless devises' antenna directivity, as well as beacon transmission, reception and processing.

Otherwise, wireless devices may not be able to discover and communicate with each other even though they are in the same network 100 and in proximity to one another. Such coordination or synchronization is difficult and costly to implement. However, wireless devices not having a common time-domain reference point for coordinating antenna control and/or beacon transmission will not communicate properly as a network.

Accordingly, it would be desirable to provide a wireless device and method of wireless communications enables wireless devices to find and communicate with each other using beacons, particularly when the wireless devices are using directional antenna systems.

In one aspect of the invention, a method is provided for discovering a wireless device using a directional antenna system configured to send and receive signals in multiple antenna sectors, the wireless device being located in a first antenna sector of the multiple antenna sectors. The method includes transmitting multiple primary beacons in corresponding primary beacon time slots, the primary beacon time slots corresponding to the multiple antenna sectors and having associated multiple secondary beacon time slots. A secondary beacon is received from the wireless device in a first secondary beacon time slot associated with a first primary beacon time slot corresponding to the first antenna sector, the secondary beacon being responsive to a first primary beacon included in the first primary beacon time slot. An additional first secondary beacon time slot is added in association with the first primary beacon time slot. The additional first secondary beacon time slot enables an additional wireless device in the first antenna sector to send an additional secondary beacon in response to a subsequent first primary beacon included in the first primary beacon time slot.

The primary beacon time slots and the associated secondary beacon time slots may be contained in a superframe. The first secondary beacon time slot associated with the first primary beacon time slot may include a next consecutive time slot following the first primary beacon time slot, and the additional first secondary beacon time slot may be a next consecutive time slot following the first secondary beacon time slot. Alternatively, the first secondary beacon time slot associated with the first primary beacon time slot may follow a last primary beacon time slot of the multiple primary beacon time slots, and the additional first secondary beacon time slot may be a next consecutive time slot following the first secondary beacon time slot.

The method of discovering the wireless device may further include notifying the wireless device of receipt of the secondary beacon in the subsequent first primary beacon included in the first primary beacon time slot. Notifying the wireless device of receipt of the secondary beacon may involve including an identification of the wireless device in the subsequent first primary beacon.

The method of discovering the wireless device may further include receiving an indication of a collision associated with additional wireless devices, located in a second antenna sector, in a second secondary beacon time slot associated with a second primary beacon time slot corresponding to the second antenna sector, the collision indication being responsive to a second primary beacon included in the second primary beacon time slot. At least two additional secondary beacon time slots may be added in association with the second primary beacon time slot. The at least two additional secondary beacon time slots may enable the additional wireless devices in the second antenna sector to send associated second secondary beacons in response to a subsequent second primary beacon included in the second primary beacon time slot.

In another aspect of the invention, an apparatus is provided for communicating over a wireless network having multiple wireless devices. The apparatus includes a directional antenna system and a transceiver. The directional antenna system is configured to communicate over the wireless network in at least a first antenna sector and a second antenna sector. The transceiver is configured to send signals to the first and second antenna sectors via the directional antenna, each signal including a first transmit beacon time slot and an associated first receive beacon time slot corresponding to the first antenna sector and a second transmit beacon time slot and an associated second receive beacon time slot corresponding to the second antenna sector. The transceiver sends a first transmit beacon in the first transmit beacon time slot to the first antenna sector and a second transmit beacon in the second transmit beacon time slot to the second antenna sector. The transceiver receives a first receive beacon in the first receive beacon time slot from a first wireless device located in the first antenna sector responding to the first transmit beacon. An additional first receive beacon time slot of the signal is associated with the first transmit beacon time slot to enable an additional wireless device in the first antenna sector to send an additional first receive beacon in response to a subsequent first transmit beacon included in the first transmit beacon time slot.

The transceiver may receive a second receive beacon in the second receive beacon time slot from a second wireless device located in the second antenna sector responding to the second transmit beacon. An additional second receive beacon time slot of the signal is associated with the second transmit beacon time slot to enable an additional wireless device in the second antenna sector to send an additional second receive beacon in response to a subsequent second transmit beacon included in the second transmit beacon time slot.

The transceiver may receive an indication of a collision in the second receive beacon time slot associated with at least a second wireless device and a third wireless device located in the second antenna sector, the collision indication being responsive to the second transmit beacon. Two additional second receive beacon time slots are added in association with the second transmit beacon time slot. The two additional receive beacon time slots enable the second and third wireless devices in the second antenna sector to send associated second receive beacons.

The directional antenna system may include multiple antennas corresponding to the plurality of sectors. Alternatively, the directional antenna system may include an adaptive antenna array having multiple beams corresponding to the plurality of sectors.

The first receive beacon time slot may be paired with the first transmit beacon time slot in a dual time slot, the first receive beacon time slot including a next consecutive time slot following the first transmit beacon time slot within the dual time slot. The additional first receive beacon time slot may be a next consecutive time slot following the first receive beacon time slot within the dual time slot. The first receive beacon time slot may follow the second transmit beacon time slot. The additional first receive beacon time slot may be a next consecutive time slot following the first receive beacon time slot. The transceiver may send an announcement that a length of a beacon period will increase before the additional first receive beacon time slot of the signal is associated with the first transmit beacon time slot.

In another aspect of the invention, an apparatus is provided for communicating over a wireless network of multiple wireless devices. The apparatus includes a directional antenna system configured to communicate over multiple antenna sectors. The apparatus also includes a transceiver configured to send signals to the antenna sectors via the directional antenna, each signal including a superframe having multiple primary beacon time slots and associated secondary beacon time slots corresponding to the antenna sectors. The transceiver sends multiple primary beacons in the multiple primary beacon time slots and receives at least one secondary beacon in one of the secondary beacon time slots from a responsive wireless device located in an antenna sector associated with the received secondary beacon. The one of the secondary beacon time slots is assigned to the responsive wireless device and an additional secondary beacon time slot, associated with the antenna sector of the responsive wireless device, is added to the superframe.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known devices and methods may be omitted so as to not obscure the description of the example embodiments. Such methods and devices are clearly within the scope of the present teachings.

In the various embodiments, a protocol for controlling beacons, sent and received through directional antennas of wireless devices in a wireless network, such as a WLAN or WPAN. The protocol provides wireless devices the ability to transmit beacons in a coordinated manner in a WLAN or WPAN using directional antennas. The wireless devices are thus able to exchange information via beacons, either directly or indirectly, to enable network management, data transmission and other communications, without having to previously coordinate antenna directivity or time synchronization of the wireless devices.

Further, according to the embodiments described herein, the wireless devices only need to switch between their respective transmit and receive circuits once during a beaconing period. Hence, guard times usually set aside for this switching operation are minimized. Once established, the timing for beacon transmission of a wireless device may change only in the event of the wireless device leaving the network, which simplifies implementation of the beaconing coordination protocol.

Figure 1:
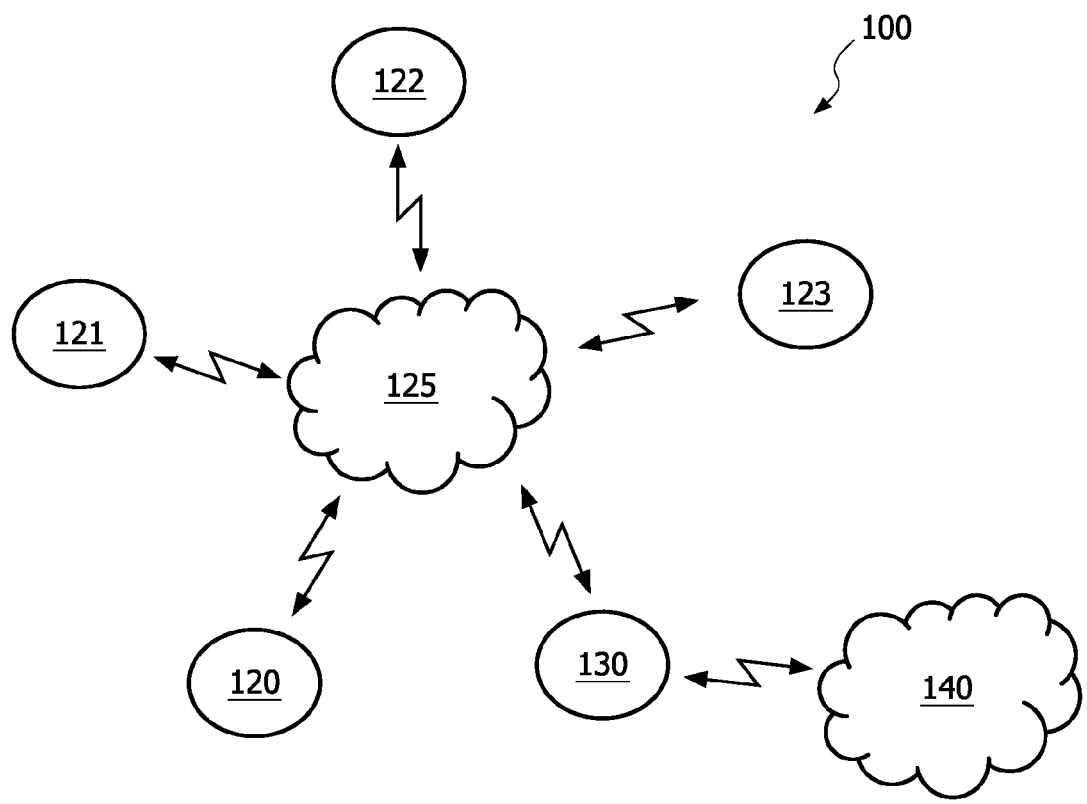
FIG. 1 is a block diagram of a conventional wireless communications network.
Figure 2:
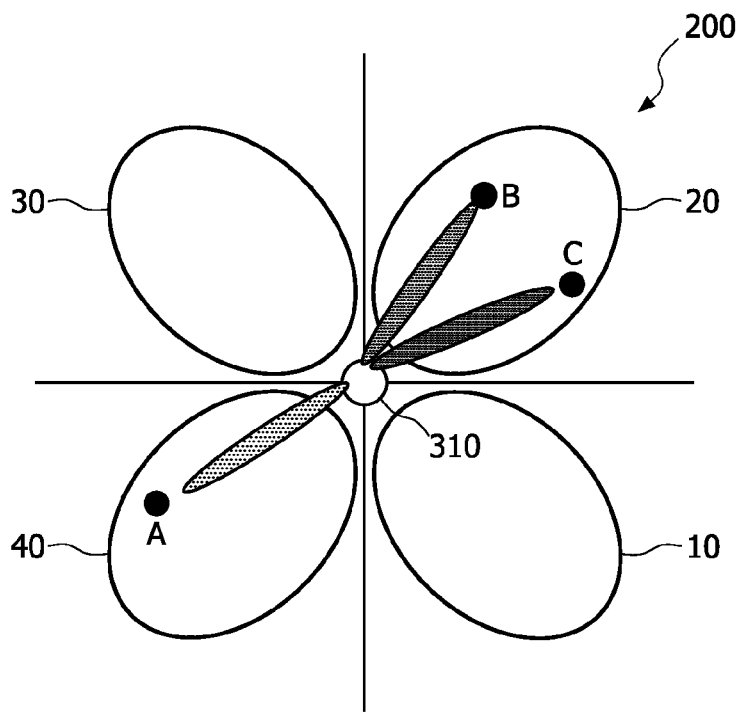
FIG. 2 is a block diagram of representative secondary devices communicating with a primary device over a wireless network according to various embodiments.

FIG. 2 is a block diagram of a representative wireless network 200, which may be a WLAN, WPAN, or the like, according to various standards and protocols. A primary wireless device 310, which may be a network access point, for example, is configured to communicate over the wireless network 200 with representative secondary wireless devices A, B and C, which may include any type of device configured to communicate over the wireless network 200, such as a personal computer, a digital television set, a digital camera and a PDA, and the like, as discussed above. For example, the wireless network 200 may be a UWB network, and the primary device 310 and the secondary devices A, B and C may be adapted to operate using a UWB protocol in accordance with WiMedia specifications. The distinction between primary and secondary devices is that the primary device (e.g., wireless device 310) initiates communications over other network 200 by sending beacons, and the secondary devices (e.g., wireless devices A, B and C) receive and respond to the primary device beacons. The location and direction of the wireless devices A, B and C are not known a priori by the primary device 310.

The identity of each wireless device as being a primary device or a secondary device is merely for purposes of explanation. Thus, in various embodiments, any wireless device initiating a communication session by transmitting beacons may be considered a primary device, and does not necessarily need to be an access point.

Figure 3:
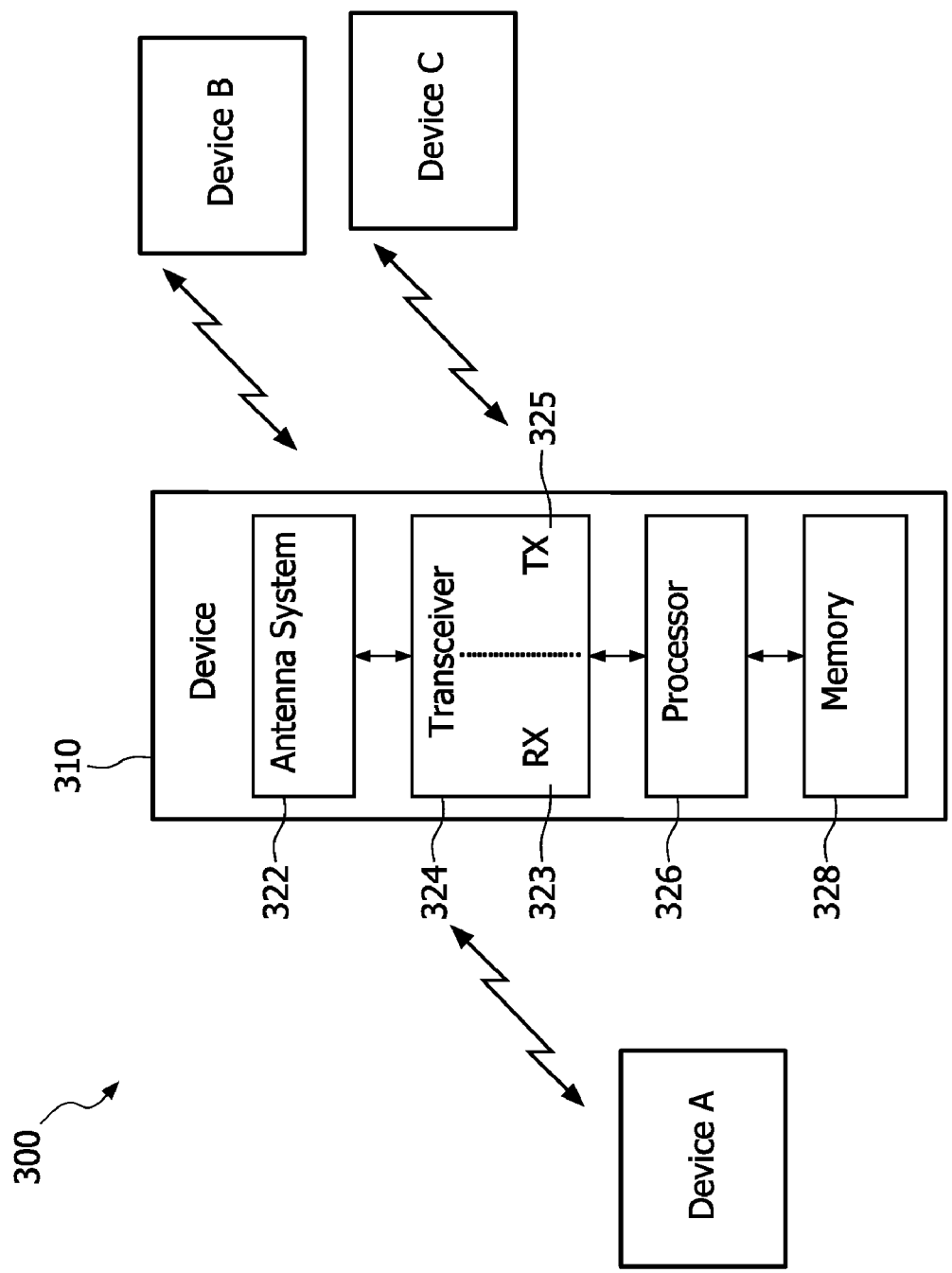
FIG. 3 is a functional block diagram of a representative primary device configured to communicate with secondary devices over a wireless network according to various embodiments.

FIG. 3 is a functional block diagram of representative primary device 310, configured to communicate with secondary devices A, B and C, according to various embodiments, over the wireless network 200. Although the primary device 310 is shown and discussed in detail, it is understood that the secondary devices A, B and C are configured and function in substantially the same manner as the primary device 310.

As will be appreciated by those skilled in the art, one or more of the various "parts" shown in FIG. 3 may be physically implemented using a software-controlled microprocessor, hard-wired logic circuits, or a combination thereof. Also, while the parts are functionally segregated in FIG. 3 for explanation purposes, they may be combined variously in any physical implementation.

Wireless device 310 includes transceiver 324, processor 326, memory 328, and antenna system 322. Transceiver 324 includes a receiver 323 and a transmitter 325, and provides functionality for wireless device 310 to communicate with other wireless devices, such as wireless devices A, B and C, over wireless communication network 200 according to the appropriate standard protocols.

Processor 326 is configured to execute one or more software algorithms, including the beaconing coordination algorithm of the embodiments described herein, in conjunction with memory 328 to provide the functionality of the primary device 310. Processor 326 may include its own memory (e.g., nonvolatile memory) for storing executable software code that allows it to perform the various functions of the primary device 310, discussed herein. Alternatively, the executable code may be stored in designated memory locations within memory 328.

In FIG. 3, antenna system 322 includes a directional antenna system which provides a capability for the primary device 310 to select from multiple antenna beams for communicating with other wireless devices in multiple directions. For example, antenna system 322 may include multiple antennas, each corresponding to one antenna beam, or antenna system 322 may include a steerable antenna or antenna array that can combine multiple different antenna elements to form a beam in different directions.

The antenna system 322 operates various sectors corresponding to the directions in which the antenna system 322 may be directed. For example, a kth wireless device has the capability to transmit and receive signals in $M_k$ directions or sectors. As stated above, these sectors may be generated using a sectorized antenna, which selects among $M_k$ directional antennas of the antenna system 322, or may be virtually formed using adaptive antenna arrays of the antenna system 322.

Different devices (e.g., primary device 310 and secondary devices A, B and C) may have different numbers and distributions of antenna sectors, and it is not necessary that all directions are covered by the various sectors of one device. For example, FIG. 2 depicts an example in which the antenna system 322 of the primary wireless device 310 defines four antenna sectors, sectors 10, 20, 30 and 40. In other words, assuming primary device 310 is device k=1, then $M_1$=4. For purposes of simplifying explanation, the representative sectors 10-40 are evenly distributed in four quadrants surrounding the primary wireless device 310 and are depicted in two dimensions. Actual sectors may have differing and/or overlapping coverage extending in three dimensions. As shown in the example of FIG. 2, secondary wireless device A is located in antenna sector 40 and secondary wireless devices B and C are located in antenna sector 20.

FIGS. 4A-4F are block diagrams of operational time lines 410-460, respectively, each of which may be included in a beacon period for a corresponding superframe, according to an embodiment. The six superframes 410-460 are sequential in that they follow one another in time, although they are not necessarily consecutive. Antenna directivity and beacon periods have not been pre-coordinated or otherwise synchronized among the primary device 310 and the secondary devices A, B and C.

Each superframe 410-460 includes a series of consecutive blocks or time slots within a beacon period, which represent fixed periods of time associated with the beaconing process. Each superframe 410-460 includes multiple time slots (e.g., 256 time slots per superframe), a portion of which may be reserved for beaconing. The time slots may vary in size, without departing from the spirit and scope of the embodiments. For example, the number of slots per superframe and/or length of time of each time slot may be adjusted to provide unique benefits for any particular situation or to meet various design requirements.

Figure 4A:
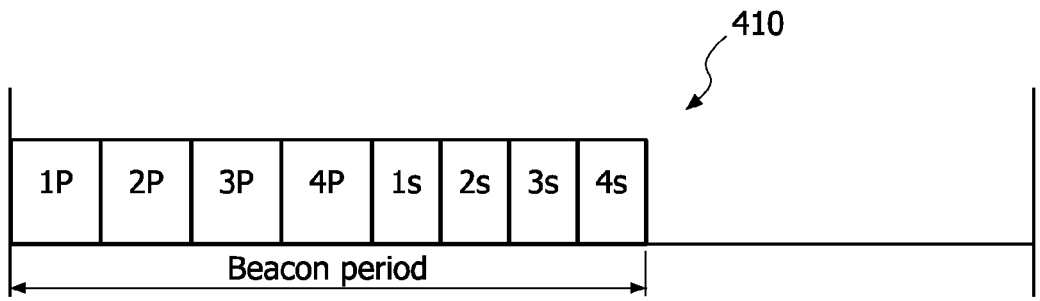
FIGS. 4A-4F are block diagrams of superframes enabling communication by wireless devices according to an embodiment.
Figure 4B:
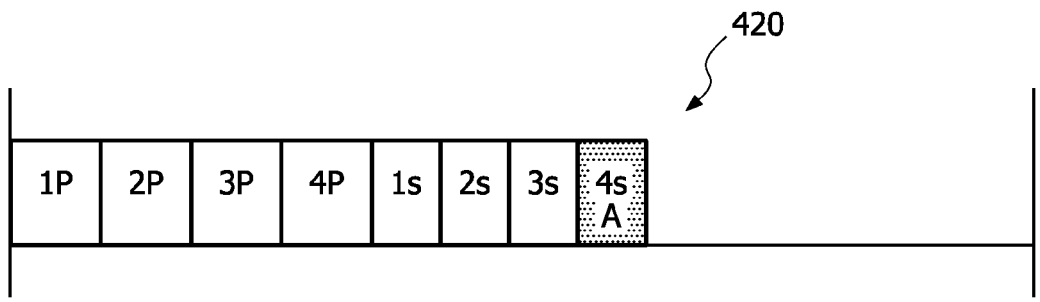
Figure 4C:
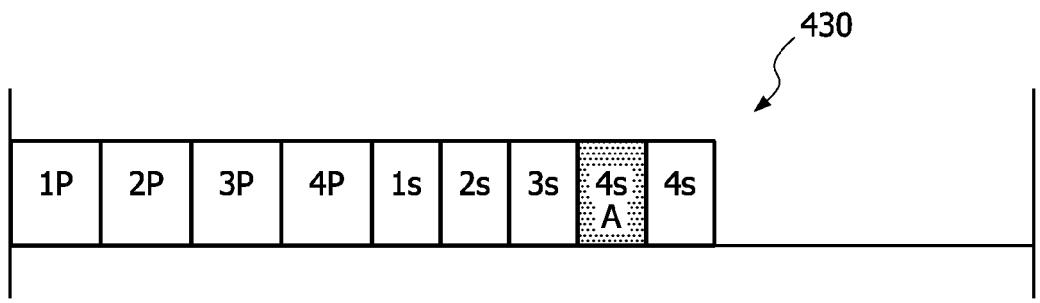
Figure 4D:
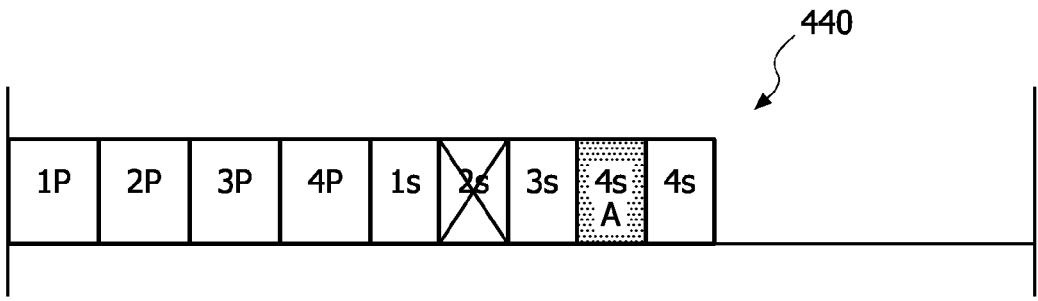
Figure 4E:
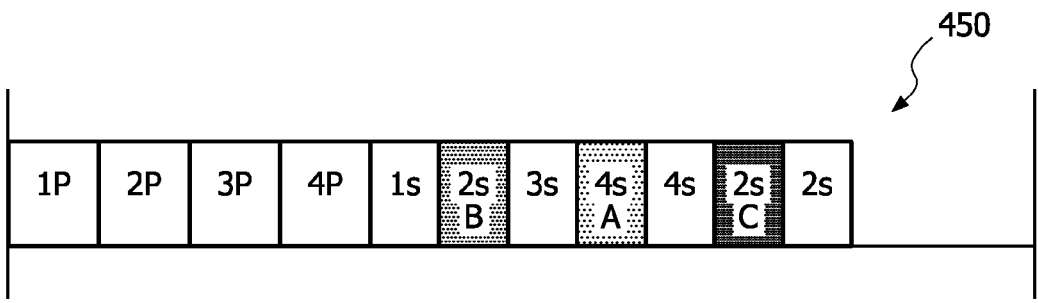
Figure 4F:
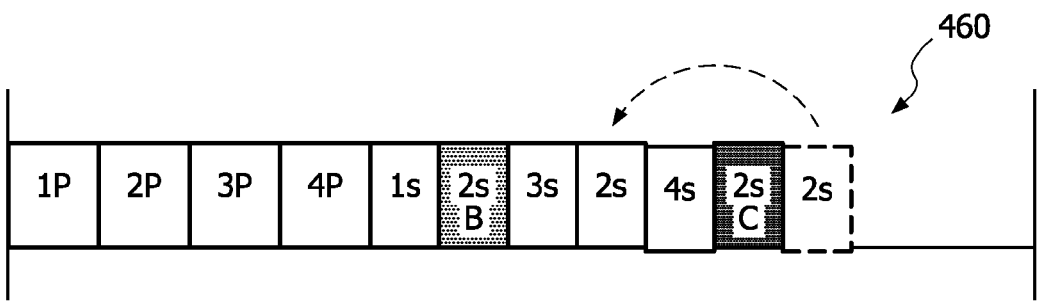
Figure 5:
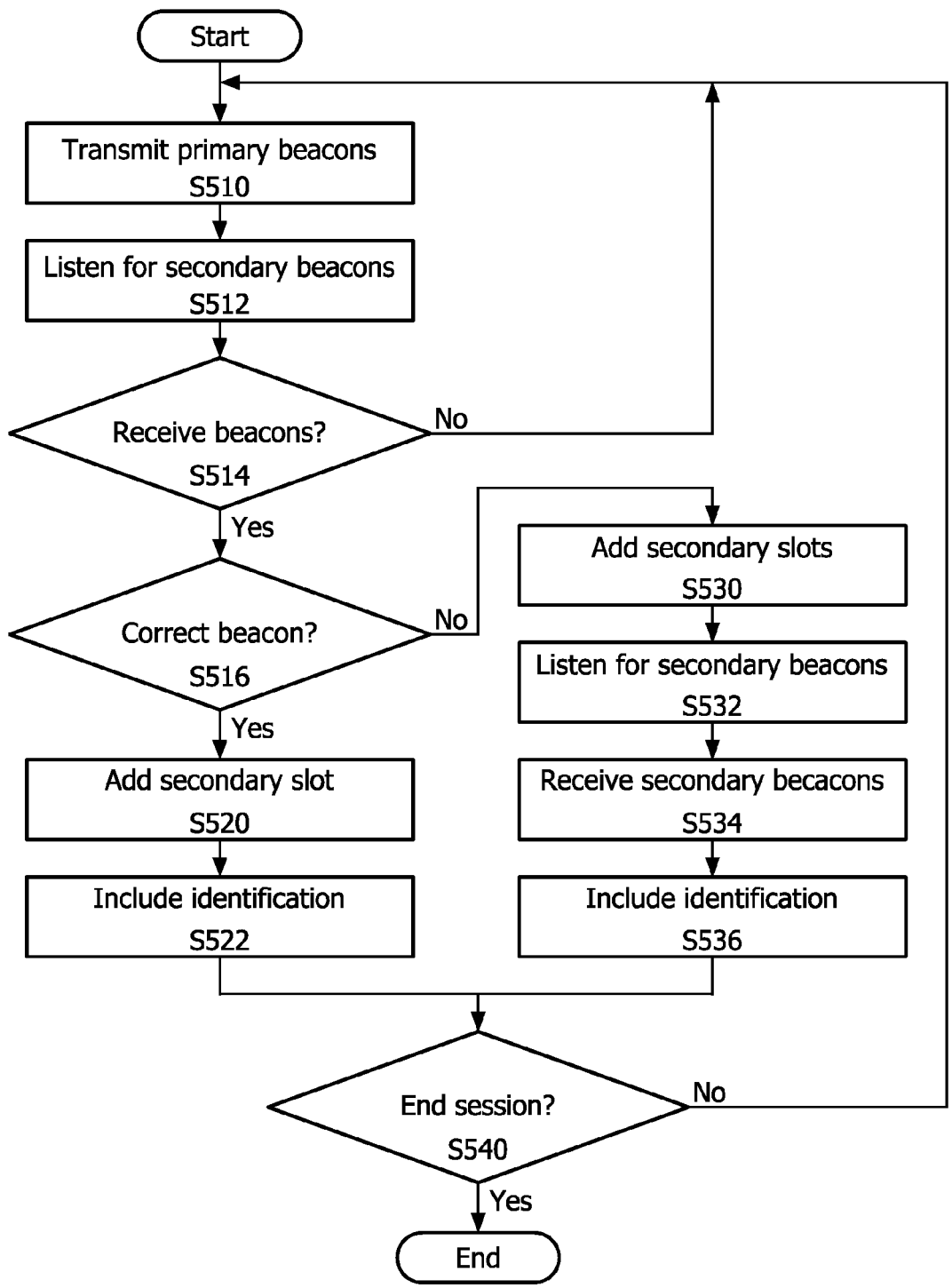
FIG. 5 is a flow chart of an antenna control process according to various embodiments.

FIG. 5 is a flow diagram showing a process for coordinating beacon transmission and reception using directional antennas, according to an embodiment. The process steps of FIG. 5 will be discussed with reference to the various superframes 410-460 of FIGS. 4A-4F.

In FIG. 5, the primary device, such as exemplary wireless device 310 shown in FIGS. 2 and 3, is considered to be the first device (k=1) in the network that transmits a beacon, thus creating a beacon period which includes $M_1$ directional beacon slots (e.g., time slots 1P-4P of FIG. 2), referred to herein as primary slots or "P-slots." As shown in FIG. 4A, a series of consecutive $M_1$ P-slots (e.g., time slots 1P-4P) are followed by a series of consecutive secondary slots or "S-slots" (e.g., time slots 1s-4s), each of which corresponds to one of the P-slots 1P-4P. Initially, there are $M_1$ S-slots, such that one S-slot corresponds to each P-slot. In alternative implementations, each P-slot may initially have more than one associated S-slot, depending on network design.

At step S510 of FIG. 5, the primary device 310 transmits a (primary) beacon in each of the P-slots 1P-4P in each of its corresponding antenna sectors 10-40. Superframe 410 of FIG. 4 is an exemplary superframe, including an initial transmission of the primary device 310. After transmitting beacons in all four antenna sectors, the primary device 310 listens for beacons in the S-slots corresponding to the P-slots at step S512. Each beacon transmitted by the primary device 310 includes information, such as the number, location and/or corresponding sector number of the S-slot(s) in which any receiving secondary wireless device should send a responsive (secondary) beacon. For example, a beacon transmitted in P-slot 4P of superframe 410 (which corresponds to antenna sector 40) identifies S-slot 4s as the appropriate time-slot in which a secondary device located in sector 40 (e.g., secondary device A) should transmit its responsive beacon. Accordingly, in response to receiving the primary beacon from the primary device 310, the secondary device transmits a beacon the S-slot(s) corresponding to the antenna sector in which it is located, if that S-slot is indicated as idle by the primary device 310.

At step S514, the primary device 310 determines whether a signal is received in an S-slot. When no signal is received (step S514: No), the primary device 310 repeats steps S510 and S512, continuing to transmit beacons and listening for responses in subsequent beacon periods of subsequent superframes. When a signal is received (step S514: Yes), the primary device 310 determines whether the signal is adequate (correct) at step S516. In other words, the primary device 310 determines whether an appropriate secondary beacon is received, e.g., from a wireless device operating in a sector corresponding to the S-slot, and is discernible. A signal that is not correct may be indicative of a number of issues. For example, the corresponding sector may include multiple secondary wireless devices, each of which is attempting to send a responsive beacon, causing a collision among the signals.

When the received signal is acceptable (step S516: Yes), the primary device 310 has discovered a secondary wireless device, and knows its sector location based on the location of the S-slot containing the responsive beacon. The primary device 310 is thus able to establish communications with the secondary wireless device. For example, referring to superframe 420 of FIG. 4B, secondary device A, which is located in antenna sector 40, provides a beacon signal in shaded S-slot 4s (indicated by the letter A) in response to the primary beacon sent by the primary device 310 in P-slot 4P.

At step S520, the primary device 310 adds one S-slot located immediately after the last S-slot of the series of S-slots in the next consecutive superframe, as shown in superframe 430 of FIG. 4C. The additional S-slot of superframe 430 is marked 4s, indicating its availability for beacons from other secondary wireless devices that may be in or added to antenna sector 40. This is necessary because S-slot 4sA is now reserved for signaling between the primary device 310 and the secondary device A in sector 40. In an embodiment, before adding another S-slot after the series of S-slots, the primary device 310 sends an announcement indicating an increase in the length of the beacon period in the superframe and/or the adjusted beacon slot boundaries. The announcement may be included in the P-slots of the next superframe.

At step S522, the primary device 310 includes the identity of secondary device A in the beacon of P-slot 4P in the next superframe (e.g., superframe 430 of FIG. 4C). The primary device 310 then continues to transmit primary beacons until the communication session ends (step S540: Yes).

Once the primary device 310 indicates a successful reception of the beacon (e.g., by including the identity of the secondary device in the beacon transmitted in the corresponding P-slot), the secondary device transmits subsequent beacons in the same S-slot in subsequent superframes. For example, the secondary device A will continue to utilize S-slot 4sA once it receives an indication that the primary device 310 has received its initial responsive secondary beacon.

Referring back to step S516, it may be determined that the received beacon is not correct (step S516: No), for example, due to a collision among multiple secondary beacons, as indicated by the X in S-slot 2s of superframe 440 in FIG. 4D. The primary device 310 will then add multiple S-slots located immediately after the last S-slot of the series of S-slots in the next consecutive superframe at step S530. Again, before adding S-slots, the primary device 310 will send an announcement indicating an increase in the length of the beacon period in the superframe and/or the adjusted beacon slot boundaries, as previously discussed.

The number of S-slots added to the next superframe may be determined to match the number of secondary devices having colliding signals in the antenna sector. For example, representative secondary devices B and C are both located in antenna sector 20, and will therefore attempt to respond to the primary beacon in P-slot 2P, which corresponds to antenna sector 20, resulting in a collision of secondary beacons.

In various embodiments, the primary device 310 may first determine the number of conflicting secondary devices and then add a corresponding number of additional S-slots. Alternatively, the primary device 310 may initially add two additional S-slots upon detecting the collision, and continue to add additional S-slots to subsequent superframes, as needed, until there are an adequate number of S-slots to accommodate the number of secondary devices in a particular sector.

At step S532, the primary device 310 listens for responsive secondary beacons. The primary device 310 receives correct beacons at step S534, since there are now sufficient S-slots corresponding to antenna sector 20 to accommodate both secondary devices B and C. If collisions continue to occur, the primary device may add an additional S-slot, as discussed above, until correct responsive secondary beacons are received.

Referring to the example depicted in FIG. 4E, because antenna sector 20 includes two secondary devices B and C (which originally sent colliding beacons), the primary device 310 added two S-slots following S-slot 4sA in step S530. Since there are only two secondary devices in sector 20, the two additional S-slots are sufficient to address the collision, and correct secondary beacons are received at step S534. Accordingly, secondary device B chooses shaded S-slot 2sB, in which it sends its secondary beacon, and secondary device C chooses (newly added) shaded S-slot 2sC, in which it sends its secondary beacon. The second additional S-slot of superframe 450 is marked 2s, indicating its availability for beacons from other secondary wireless devices that may be in or added to antenna sector 20. In various embodiments, the choice of the available S-slots may differ. For example, secondary devices B and C may both choose newly added S-slots, while the original S-slot associated with sector 2 (e.g., S-slot 2s of FIG. 4C) remains unassigned.

The primary device 310 is thus able to establish communications with the secondary devices B and C. The primary device 310 includes the identity of the secondary devices B and C in the primary beacon of P-slot 2P in the next superframe in step S536. The primary device 310 then continues to transmit primary beacons according to the discovery process until the communication session ends to hibernate or power-off (step S540: Yes). The secondary devices B and C will continue to utilize S-slots 2sB and 2sC, respectively, once they receive an indication that the primary device 310 has received their initial responsive secondary beacons.

FIG. 4F depicts exemplary superframe 460, which shows a situation in which a secondary device leaves the network, e.g., by powering down or physically being removed from the network boundaries. More particularly, superframe 460 shows secondary device A of sector 40, for example, being removed from the network. In response, the primary device 310 moves the location of the last S-slot (S-slot 2s) to the location of emptied S-slot 4sA. The primary device 310 sends an announcement indicating the adjusted beacon slot boundaries, e.g., in the corresponding P-slots of the next superframe, whenever the S-slots are rearranged to account for emptied S-slots.

FIGS. 6A-6F are block diagrams of operational time lines 610-660, respectively, each of which may be included in a beacon period for a corresponding superframe, according to another embodiment. The six superframes 610-660 are sequential in that they follow one another in time, although they are not necessarily consecutive. The beacon periods have not been pre-coordinated or otherwise synchronized among the primary wireless device 310 and the secondary wireless devices A, B and C.

Each superframe 610-660 of FIGS. 6A-6F a series of consecutive blocks or time slots within a beacon period, which represent fixed periods of time associated with the beaconing process. Each superframe 610-660 includes multiple time slots (e.g., 256 time slots per superframe), a portion of which is reserved for beaconing. The time slots may vary in size, without departing from the spirit and scope of the embodiments. For example, the number of slots per superframe and/ or length of time of each time slot may be adjusted to provide unique benefits for any particular situation or to meet various design requirements.

Superframes 610-660 do not include a series of consecutive P-slots (e.g., containing primary beacons) followed by a series of consecutive S-slots (e.g., containing secondary beacons) corresponding to the P-slots, as in the embodiment shown by superframes 410-460. Rather, superframes 610-660 have consecutive dual time slots (D-slots) in their respective beacon periods. For example, referring to FIG. 6A, superframe 610 includes four representative D-slots, 1D-4D, each of which corresponds to an antenna sector (e.g., antenna sectors 10-40 of FIG. 2). Each D-slot has one P-slot for primary beacons and initially one corresponding S-slot for responsive secondary beacons. For example, D-slot 4D initially includes P-slot 4P and corresponding S-slot 4s. In alternative implementations, each P-slot may initially have more than one associated S-slot, depending on network design.

Figure 6A:
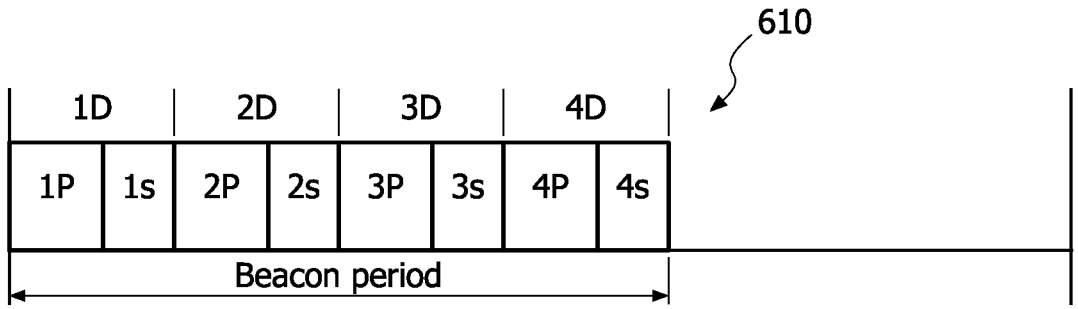
FIGS. 6A-6F are block diagrams of superframes enabling communication by wireless devices according to an embodiment.
Figure 6B:
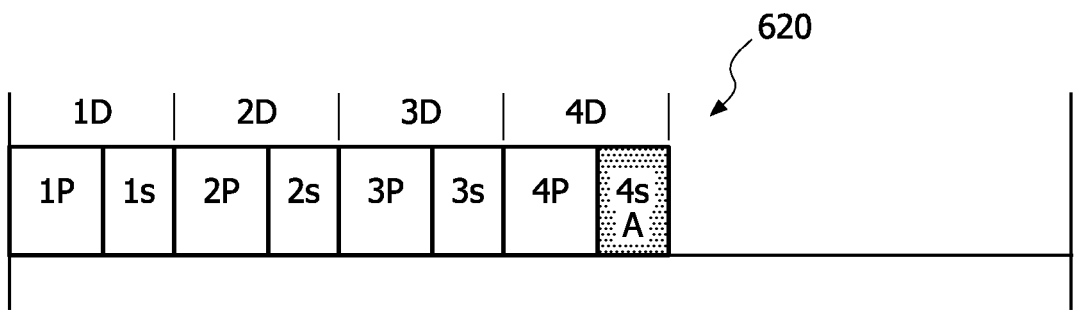

As in the embodiment described above, S-slots may be added to the superframe, as needed. However, as shown in FIG. 6B, for example, the additional S-slots are added immediately following the existing S-slot(s) in a corresponding D-slot, expanding the length of the D-slot, as opposed to being added after a series of consecutive S-slots, which follow a series of consecutive P-slots, as shown in FIG. 4B.

Operation of the embodiment depicted in FIGS. 6A-6F may be described with reference to the flowchart depicted in FIG. 5. More particularly, at step S510 of FIG. 5, the primary wireless device 310 transmits a (primary) beacon in each of the P-slots 1P-4P in each of its corresponding antenna sectors 10-40. The P-slots 1P-4P and one associated S-slot 1s-4s are included in corresponding D-slots 1D-4D, as discussed above. An exemplary superframe of the initial transmission of the primary device 310 is superframe 610 of FIG. 6A.

After transmitting beacons in all four antenna sectors, the primary device 310 listens for beacons in the S-slots corresponding to the P-slots at step S512. Each beacon transmitted by the primary device 310 includes information, such as the number, location and/or corresponding sector number of the S-slot(s) in which any receiving secondary wireless device should said a responsive (secondary) beacon. For example, a beacon transmitted in P-slot 4P of superframe 610 (which corresponds to antenna sector 40) identifies S-slot 4s (within the same D-slot) as the appropriate time-slot in which a secondary device located in sector 40 (e.g., secondary device A) should include it responsive beacon. Accordingly, in response to receiving a beacon from the primary device 310, the secondary device transmits a beacon in the S-slot(s) corresponding to the antenna sector in which it is located, if that S-slot is indicated as idle by the primary device 310. For example, the secondary device A transmits its responsive beacon in S-slot 4s.

At step S514, the primary device 310 determines whether a signal is received during an S-slot. When no signal is received (step S514: No), the primary device 310 repeats steps S510 and S512, continuing to transmit beacons and listening for responses in subsequent beacon periods of subsequent superframes. When a signal is received (step S514: Yes), the primary device 310 determines whether the signal is adequate (correct) at step S516. In other words, the primary device 310 determines whether an appropriate secondary beacon is received, e.g., from a wireless device operating in a sector corresponding to the S-slot. A signal that is not correct is indicative of a number of issues. For example, the corresponding sector may include multiple secondary wireless devices, each of which is attempting to send a responsive beacon, causing a collision among the signals.

When the received signal is acceptable (step S516: Yes), the primary device 310 has discovered a secondary wireless device, and knows its sector location based on the location of the S-slot containing the responsive beacon. The primary device 310 is thus able to establish communications with the secondary wireless device at step. For example, referring to superframe 620 of FIG. 6B, secondary device A, which is located in antenna sector 40, provides a beacon signal in shaded S-slot 4s (indicated by the letter A) in response to the primary beacon sent by the primary device 310 in P-slot 4P.

Figure 6C:
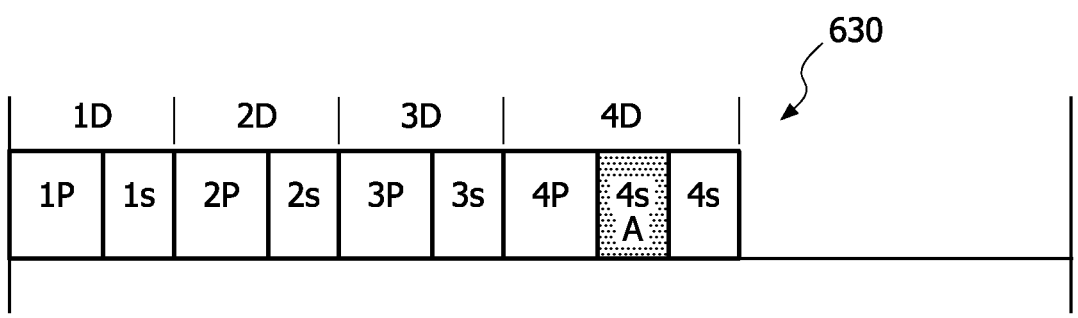
Figure 6D:
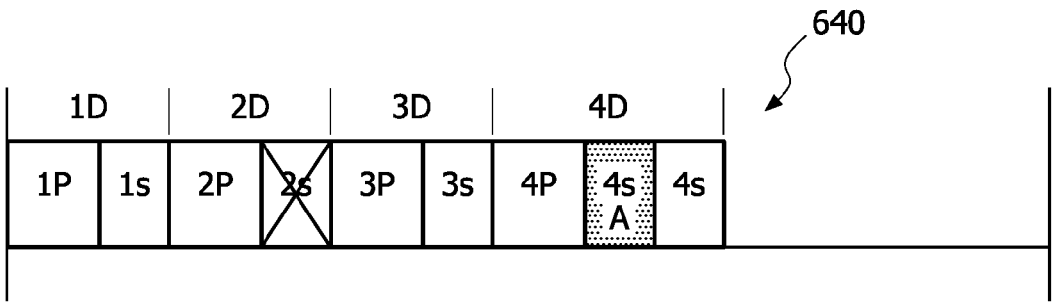

At step S520, the primary device 310 will add one S-slot located immediately after the last S-slot of the corresponding D-slot in the next consecutive superframe, as shown in superframe 630 of FIG. 6C. The additional S-slot of superframe 630 is marked 4s, indicating its availability for beacons from other secondary wireless devices that may be in or added to antenna sector 40. This is necessary because S-slot 4sA is now reserved for signaling between the primary device 310 and the secondary device A in sector 40. In an embodiment, before adding another S-slot to the D-slot, the primary device 310 sends an announcement indicating an increase in the length of the beacon period in the superframe and/or the adjusted beacon slot boundaries. The announcement may be included in the P-slots of the next superframe.

At step S522, the primary device 310 includes the identity of the secondary device A in the beacon of P-slot 4 in the next superframe (e.g., superframe 630 of FIG. 6C). The primary device 310 then continues to transmit primary beacons until the communication session ends to hibernate or power-off (step S540: Yes).

Once the primary device 310 indicates a successful reception of the beacon (e.g., by including the identity of the secondary device in the beacon transmitted in the corresponding P-slot), the secondary device transmits subsequent beacons in the same S-slot in following superframes. For example, the secondary device A will continue to utilize S-slot 4sA once it receives indication that the primary device 310 has received its initial responsive secondary beacon.

Referring back to step S516, it may be determined that the received beacon is not correct (step S516: No), for example, due to a collision among multiple secondary beacons, as indicated by the X in S-slot 2s of superframe 640 in FIG. 6D. The primary device 310 will then add multiple S-slots located immediately after the last S-slot in the corresponding D-slot in the next consecutive superframe at step S530. Again, before adding S-slots, the primary device 310 will send an announcement indicating an increase in the length of the beacon period in the superframe and/or the adjusted beacon slot boundaries, as previously discussed.

The number of S-slots added in the next superframe may be determined to match the number of secondary devices having colliding signals in the antenna sector. For example, secondary devices B and C are both located in antenna sector 20, and will therefore attempt to respond to the primary beacon in P-slot 2P, which corresponds to antenna sector 20, resulting in a collision of secondary beacons sent form second devices B and C. In various embodiments, the primary device 310 may first determine the number of conflicting secondary devices and then add a corresponding number of additional S-slots. Alternatively, the primary device 310 may initially add two additional S-slots upon detecting the collision, and continue to add additional S-slots to subsequent superframes, as needed, until there are an adequate number of S-slots to accommodate the number of secondary devices in a particular sector, with one unassigned S-slot left over. Yet another alternative is that the primary device 310 may initially add only one additional S-slots upon detecting the collision, and continue to add additional S-slots to subsequent superframes, as needed, until there are an adequate number of S-slots to accommodate the number of secondary devices in a particular sector. Then, an additional unassigned S-slot is subsequently added to the superframe after the secondary devices have been assigned S-slots.

Figure 6E:
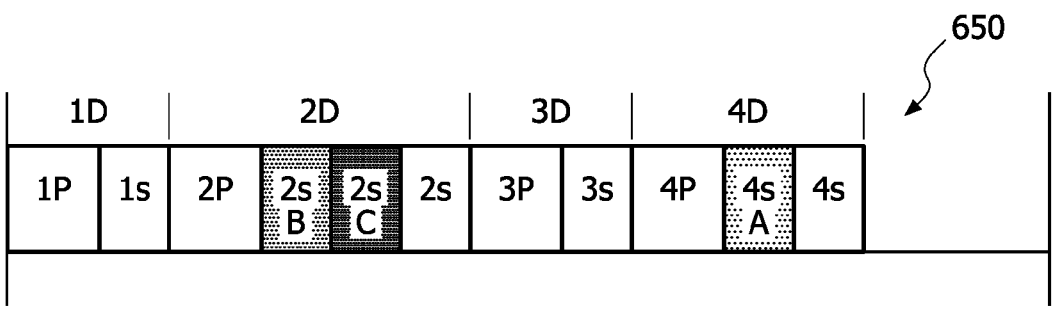

Referring to the example depicted in FIGS. 2 and 6E, the antenna sector 20 includes two secondary devices B and C, which send colliding beacons, as stated above. In step S530, the primary device 310 adds two S-slots in the D-slot following S-slot 2s. Since there are only two secondary devices in sector 20, the two additional S-slots are sufficient to address the issues. According, secondary device B chooses S-slot 2sB, in which it sends its secondary beacon, and secondary device C chooses S-slot 2sC, in which it sends its secondary beacon. The additional S-slot of superframe 450 is marked 2s, indicating its availability for beacons from other secondary wireless devices that may be in or added to antenna sector 20. As described above, in an embodiment, the primary device 310 may add just one S-slot at step S530, such that D-slot 2D has a total of two S-slots, one for each of the secondary devices B and C. Then, the additional S-slot, marked 2s, is added to D-slot 2D in a subsequent superframe. The result of each process, however, is the superframe 650 of FIG. 6E.

At step S532, the primary device 310 listens for responsive secondary beacons. The primary device 310 receives correct secondary beacons at step S534, e.g., since there are now sufficient S-slots corresponding to antenna sector 20 to accommodate both secondary devices B and C. If collisions continue to occur, the primary device may add an additional S-slot, as discussed above, until correct responsive secondary beacons are received.

At step S536, the primary device 310 includes the identity of the secondary devices B and C in the primary beacon of P-slot P2, e.g., in the next superframe. The primary device 310 then continues to transmit primary beacons according to the discovery process until the communication session ends (step S540: Yes). The secondary devices B and C will continue to utilize shaded S-slots 2sB and 2sC in D-slot 2D, respectively, once they receive an indication that the primary device 310 has received their initial responsive secondary beacons.

Figure 6F:
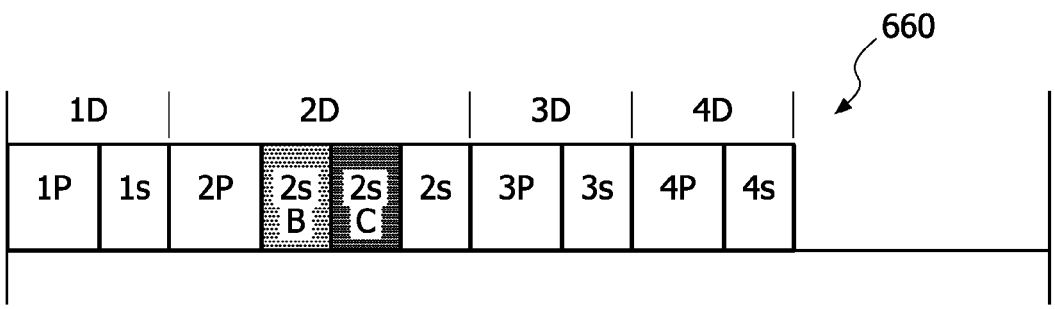

FIG. 6F depicts exemplary superframe 660, which shows a situation in which a secondary device leaves the network, e.g., by powering down or physically being removed from the network boundaries. More particularly, superframe 660 shows secondary device A of sector 40, for example, being removed from the network. In response, the primary device 310 reduces D-slot 4D to its original size (P-slot 4P and S-slot 4s). The primary device 310 announces the adjusted beacon slot boundaries, e.g., in the corresponding P-slots of the next superframe, whenever the S-slots are rearranged to account for emptied S-slots.

According to the various embodiments discussed herein, wireless devices are able to discover and/or communicate without being previously coordinated with each other. More particularly, the wireless devices are able to coordinate their respective beacon transmissions through directional antennas without having prior knowledge of one another's existence and location. Also, the process is flexible enough to accommodate different numbers of secondary devices in various antenna sectors, as well as different types of antennas.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A method of discovering a wireless device (A) using a directional antenna system (322) configured to send and receive signals in a plurality of antenna sectors (10-40), the wireless device being located in a first antenna sector of the plurality of antenna sectors, the method comprising:
transmitting a plurality of primary beacons in a corresponding plurality of primary beacon time slots, the plurality of primary beacon time slots (1P-4P) corresponding to the plurality of antenna sectors and having an associated plurality of secondary beacon time slots (1s-4s);
receiving a secondary beacon from the wireless device in a first secondary beacon time slot (4sA) associated with a first primary beacon time slot (4P) corresponding to the first antenna sector (40), the secondary beacon being responsive to a first primary beacon included in the first primary beacon time slot; and
adding an additional first secondary beacon time slot (4s) in association with the first primary beacon time slot, wherein the additional first secondary beacon time slot enables an additional wireless device in the first antenna sector to send an additional secondary beacon in response to a subsequent first primary beacon included in the first primary beacon time slot.

2. The method of claim 1, wherein the plurality of primary beacon time slots and the associated plurality of secondary beacon time slots are contained in a superframe.

3. The method of claim 2, wherein the first secondary beacon time slot associated with the first primary beacon time slot comprises a next consecutive time slot following the first primary beacon time slot.

4. The method of claim 3, wherein the additional first secondary beacon time slot comprises a next consecutive time slot following the first secondary beacon time slot.

5. The method of claim 2, wherein the first secondary beacon time slot associated with the first primary beacon time slot follows a last primary beacon time slot of the plurality of primary beacon time slots.

6. The method of claim 5, wherein the additional first secondary beacon time slot comprises a next consecutive time slot following the first secondary beacon time slot.

7. The method of claim 1, further comprising:
notifying the wireless device of receipt of the secondary beacon in the subsequent first primary beacon included in the first primary beacon time slot.

8. The method of claim 7, wherein notifying the wireless device of receipt of the secondary beacon comprises including an identification of the wireless device in the subsequent first primary beacon.

9. The method of claim 1, further comprising:
receiving an indication of a collision associated with additional wireless devices, located in a second antenna sector, in a second secondary beacon time slot associated with a second primary beacon time slot corresponding to the second antenna sector, the collision indication being responsive to a second primary beacon included in the second primary beacon time slot; and
adding at least two additional secondary beacon time slots in association with the second primary beacon time slot, wherein the at least two additional secondary beacon time slots enable the additional wireless devices in the second antenna sector to send associated second secondary beacons in response to a subsequent second primary beacon included in the second primary beacon time slot.

10. An apparatus for communicating over a wireless network comprising a plurality of wireless devices, the apparatus comprising:
a directional antenna system (322) configured to communicate over the wireless network in at least a first antenna sector and a second antenna sector; and
a transceiver (324) configured to send signals to the first and second antenna sectors via the directional antenna, each signal comprising a first transmit beacon time slot (4P) and an associated first receive beacon time slot (4s) corresponding to the first antenna sector (40) and a second transmit beacon time slot (2P) and an associated second receive beacon time slot (2s) corresponding to the second antenna sector (20), the transceiver sending a first transmit beacon in the first transmit beacon time slot to the first antenna sector and a second transmit beacon in the second transmit beacon time slot to the second antenna sector;
wherein the transceiver (324) receives a first receive beacon in the first receive beacon time slot (4sA) from a first wireless device located in the first antenna sector responding to the first transmit beacon; and
wherein an additional first receive beacon time slot (4s) of the signal is associated with the first transmit beacon time slot (4P) to enable an additional wireless device in the first antenna sector to send an additional first receive beacon in response to a subsequent first transmit beacon included in the first transmit beacon time slot.

11. The apparatus of claim 10, wherein the transceiver receives a second receive beacon in the second receive beacon time slot from a second wireless device located in the second antenna sector responding to the second transmit beacon; and
wherein an additional second receive beacon time slot of the signal is associated with the second transmit beacon time slot to enable an additional wireless device in the second antenna sector to send an additional second receive beacon in response to a subsequent second transmit beacon included in the second transmit beacon time slot.

12. The apparatus of claim 10, wherein the transceiver receives an indication of a collision in the second receive beacon time slot associated with at least a second wireless device and a third wireless device located in the second antenna sector, the collision indication being responsive to the second transmit beacon, and adds two additional second receive beacon time slots in association with the second transmit beacon time slot, and
wherein the two additional receive beacon time slots enable the second and third wireless devices in the second antenna sector to send associated second receive beacons.

13. The apparatus of claim 10, wherein the directional antenna system comprises a plurality of antennas corresponding to the plurality of sectors.

14. The apparatus of claim 10, wherein the directional antenna system comprises an adaptive antenna array having a plurality of beams corresponding to the plurality of sectors.

15. The apparatus of claim 10, wherein the first receive beacon time slot is paired with the first transmit beacon time slot in a dual time slot, the first receive beacon time slot comprising a next consecutive time slot following the first transmit beacon time slot within the dual time slot.

16. The apparatus of claim 15, wherein the additional first receive beacon time slot comprises a next consecutive time slot following the first receive beacon time slot within the dual time slot.

17. The apparatus of claim 10, wherein the first receive beacon time slot follows the second transmit beacon time slot.

18. The apparatus of claim 17, wherein the additional first receive beacon time slot comprises a next consecutive time slot following the first receive beacon time slot.

19. The apparatus of claim 10, wherein the transceiver sends an announcement that a length of a beacon period will increase before the additional first receive beacon time slot of the signal is associated with the first transmit beacon time slot.

20. An apparatus for communicating over a wireless network comprising a plurality of wireless devices, the apparatus comprising:
a directional antenna system (322) configured to communicate over a plurality of antenna sectors (10-40); and
a transceiver (324) configured to send signals to the plurality of antenna sectors via the directional antenna, each signal comprising a superframe having a plurality of primary beacon time slots (1P-4P) and an associated plurality of secondary beacon time slots (1s-4s) corresponding to the plurality of antenna sectors, the transceiver sending a plurality of primary beacons in the plurality of primary beacon time slots and receiving at least one secondary beacon in one of the plurality of secondary beacon time slots (4sA) from a responsive wireless device (A) located in an antenna sector (40) associated with the received secondary beacon;

wherein the one of the plurality of secondary beacon time slots (4As) is assigned to the responsive wireless device and an additional secondary beacon time slot (4s), associated with the antenna sector of the responsive wireless device, is added to the superframe.

* * * * *